Oct. 24, 1967   D. C. BEER   3,349,202
SNAP-ACTION ELECTRIC SWITCHES
Filed Aug. 21, 1964   2 Sheets-Sheet 1
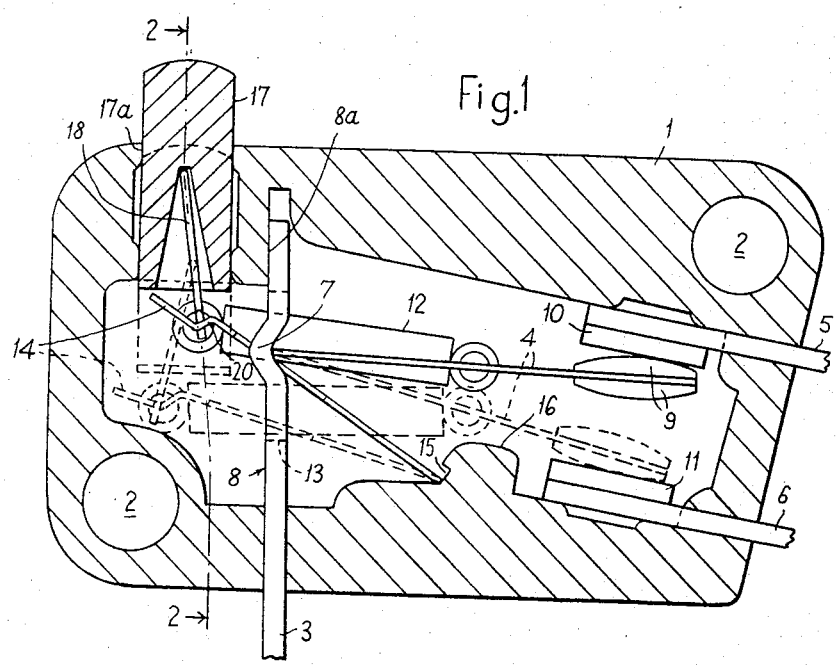
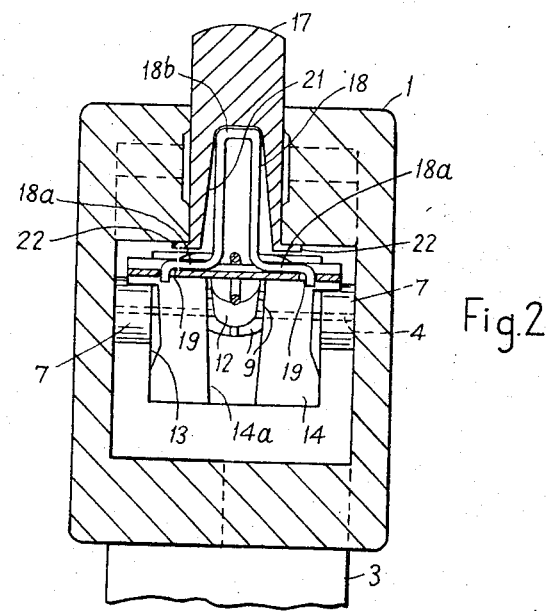
Inventor
D.C. BEER
By Holcombe, Wetherill & Brisebois
Attorney

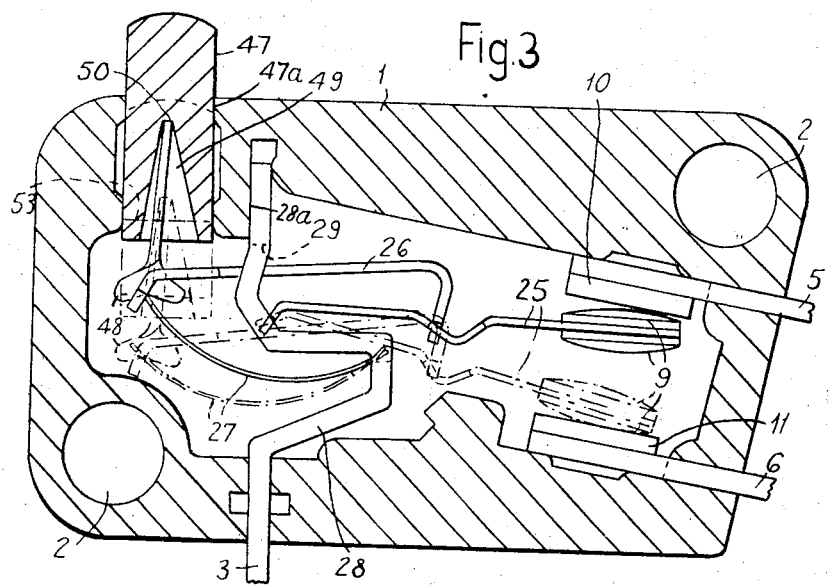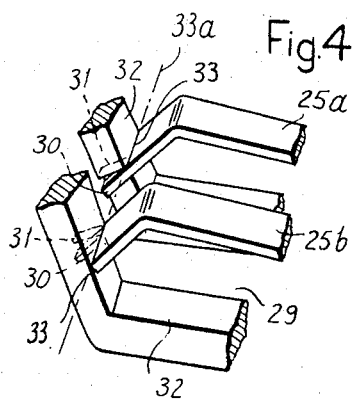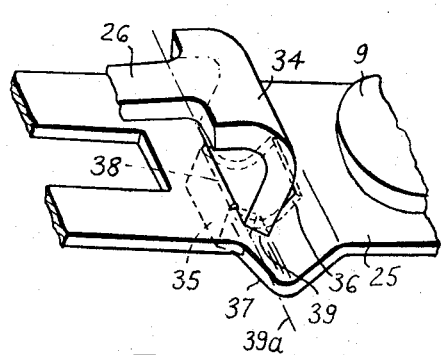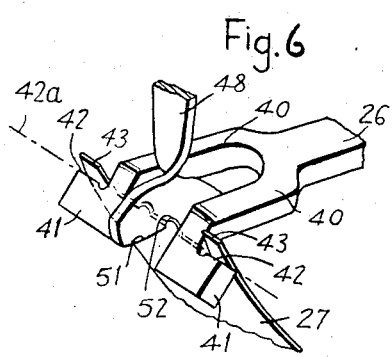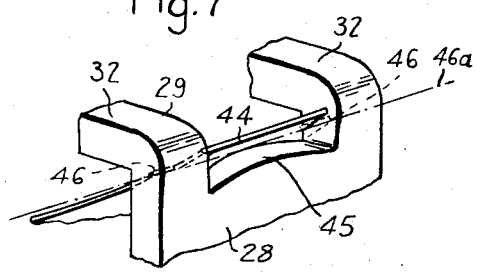

United States Patent Office 3,349,202
Patented Oct. 24, 1967

3,349,202
SNAP-ACTION ELECTRIC SWITCHES
Donald Courtney Beer, Newick, England, assignor to Otehall Limited, Sussex, England, a British company
Filed Aug. 21, 1964, Ser. No. 391,202
7 Claims. (Cl. 200—67)

The present invention relates to snap-action electric switches, and particularly to snap-action microswitches, of the kind in which a hinged contact arm is arranged to snap-over from one position to another under the action of a spring-loaded over-centre mechanism.

In such switches, the over-centre mechanism is normally actuated by a plunger and an object of the present invention is to eliminate the rubbing which occurs in hitherto known switches between the plunger and the member of the mechanism on which the plunger operates. According to the invention, this is achieved by connecting the plunger to said member of the mechanism by a link which is pivoted to the plunger and the member.

Preferably the connecting link is pivoted to the plunger about an axis lying in a central longitudinal plane of the plunger and spaced from the end of the plunger adjacent the member of the mechanism upon which the plunger operates. This reduces side thrust on the plunger to a minimum and consequently, wear on the plunger sides.

Another object of the invention is to provide a snap-action switch of the kind referred to above in which one or more pairs of mutually hinged members of the over-centre mechanism are hinged together by one member of a hinged pair having an edge or aligned edges resting and pivoting on a surface portion or portions of the other member of the pair and vice versa.

In order that the present invention may be more readily understood, reference will now be made to the accompanying drawings in which:

FIGURE 1 is a side elevation of one embodiment of microswitch according to the invention, the facing side wall of the switch casing having been removed, FIGURE 2 is a section on the line 2—2 of FIGURE 1, FIGURE 3 is a side elevation of another embodiment of microswitch with the facing side wall of the switch casing removed, FIGURES 4 to 7 are enlarged, fragmentary, perspective views of the various hinged connections in the switch illustrated in FIGURE 3, Referring firstly to FIGURES 1 and 2, the snap-action microswitch illustrated includes an insulating casing 1 provided with two fixing apertures 2. It is a two-way switch in which a terminal 3 may be selectively connected through a hinged contact carrying arm or arm member 4 to one or other of the terminals 5 and 6.

The contact carrying arm 4 is a flat bifurcated member and the end edges of the arms of the fork are pivoted in the apex of a kink 7 in a support member 8, which is an integral extension of the terminal 3. The end of the contact carrying arm 4 remote from its pivot is provided with contacts 9 for engaging contacts 10 and 11 associated respectively with the terminals 5 and 6. The end of the support member 8 remote from the terminal 3 is supported by an abutment surface 8a formed in the top wall of the casing 1.

The contact carrying arm 4 is held in pivoting engagement with the kink 7 by a tension coil spring 12 which has one end attached to the arm 4 adjacent the base of the fork, extends through an aperture 13 in the support member 8 and has its other end attached to an actuating member 14. The actuating member 14 is formed from sheet material and is provided adjacent the point of attachment of the spring 12 with a slot 14a which allows the spring to move freely relatively to the member 14 on operation of the switch. The actuating member extends back through the aperture 13 in the support member and has its end remote from the point of attachment of the spring pivoted in a groove 15 in the side of an abutment 16 integral with the switch casing 1.

The actuating member 14 is movable about its pivot by a plunger 17 which is slidable in a passageway 17a in the top wall of the casing and is connected to the member 14 by a link 18 pivoted to the plunger and the actuating member. This connecting link 18 is formed up from wire and is of the shape shown in FIGURE 2. The two ends of the wire are arranged in two apertures 19 in the actuating member in order positively to locate the link in position in the apex of a kink 20 which forms a pivot with the portions 18a of the link. The portion 18b of the link is seated in the apex of a deep, triangular-shaped slot 21 in the plunger 17 to provide the pivot between the plunger and the link. The axis of this latter pivot preferably lies in a central longitudinal plane of the plunger, and the slot is relatively deep, as shown, in order to space the pivot from the end of the plunger adjacent the actuating member so as to reduce side thrust of the plunger to a minimum.

The tension spring 12 normally biases the moving contact carrying arm 4 and the actuating member 14 to their upper positions, that is with the upper contact 9 in engagement with the contact 10, as shown in full lines in FIGURE 1. In this position shoulders 22 on the plunger 17 abut the inside surface of the casing to define the upper position of the actuating member and to prevent the plunger from coming out of the casing. When the plunger is depressed, the actuating member is moved about its pivot to move the longitudinal axis of the spring over centre with respect to the pivot axis of the contact carrying arm 4 and thereby cause the arm 4 to snap over from its upper position to its lower position, shown in broken lines in FIGURE 1, where the lower contact 9 engages the contact 11.

Similarly to the switch shown in FIGURES 1 and 2, the snap-action microswitch illustrated in FIGURES 3 to 7 is a two-way switch and comprises an insulating casing 1, fixing apertures 2 and terminals 3, 5, 6. However, it differs from the switch shown in FIGURES 1 and 2 in that the contact carrying arm 25 is moved about its pivot selectively to engage the contacts 9 with the contacts 10 and 11 by the over centre action of a rocker member 26, instead of a coil spring. The rocker member 26 is hingedly connected at one end to the arm 25 and at its other end to a leaf or strip spring 27 which is held under compression between the end of the rocker member and a support member 28 for the arm 25. Thus the rocker member 26 resiliently urges the arm 25 against its hinge connection with the support member 28. The latter is an integral extension of the terminal 3 and its end remote from the terminal 3 is supported by an abutment 28a formed in the top wall of the casing 1.

The contact-carrying arm 25 is a bifurcated member and the free ends of the form arms 25a, 25b are bent downwardly and form a hinge connection with an inclined part of the support member 28 as shown in FIGURE 4. The support member has a slot 29 extending along a major portion of its length and the free ends of the form arms are formed with projecting portions 30 which rest against the aligned edges of shoulders 31 at the inner edges of the portions 32 of the support member on opposite sides of the slot 29. At the bases of the portions 30 the fork arms have shoulders 33 extending approximately at right angles to the portions 30 and having their aligned edges at the upper faces of the fork arms 25a, 25b resting respectively on the portions 32 and pivoting along the line 33a.

The rocker member 26 extends through the slot 29 and is normally in a position above the contact-carrying arm 25. It is hinged to the latter, as shown in FIGURE 5, by its end portion 34 which is of increased width and is terminated by a tongue 35 which is of less width than the portion 34. The portion 34 is bent downwardly and the tongue 35 engages in a rectangular aperture 36 in a transversely kinked part 37 of the arm 25. The tongue 35 engages against the edge of the end wall 38 of the aperture 36 and aligned edges of the shoulders 39 at opposite sides of the tongue 35 rest respectively on the portions of the arm 25 on opposite sides of the aperture and pivot along the line 39a.

FIGURE 6 illustrates the manner in which the rocker member 26 is hingedly connected to the leaf spring 27. At this end the member 26 is bifurcated and each fork arm 40 has a laterally projecting portion 41 at its free end forming a shoulder 42. The free ends of the arms 40 are bent downwardly and the edges of the shoulders 42 engage respectively behind lugs 43 which project from the adjacent end of the spring 27 and are urged against the edges of the shoulders by the compression of the spring. The arms 40 also rest on the adjacent end edge of the spring between the lugs 43 and the rocker member and spring pivot with respect to one another about an axis 42a.

The other end of the spring 27 is hinged to the support member 28 shown in FIGURE 7. A tongue 44 at the end of the spring and of less width than the rest of the spring projects into the slot 29 and engages the edge of the end wall 45 of the slot. The shoulders 46 on opposite sides of the tongue 44 rest respectively against the portions 33 of the support member and pivot along the line 46a. The end wall 45 is of arcuate shape so that if the leaf spring has to self-centre for any reason the middle portion of the tongue 44 can swivel on the arcuate end and still present a line contact hinging action with respect to the support member 28. The support member is given the shape shown in FIGURE 3 so as to provide for the length of the spring 27 whilst retaining the length of the switch as small as possible.

The switch is operated by a plunger 47 (FIGURE 3) which is slidably guided in a passageway 48 through the top wall of the casing 1 and is connected to the left-hand end of the spring 27 by a connecting link 48 formed from sheet material. The plunger has a deep slot 49 in its end adjacent the rocker member 26, which slot is of triangular cross-section, and the link 48 has a straight end edge 50 at its upper end which pivots in the apex of the slot 49. The apex of the slot lies in a central longitudinal plane of the plunger so that the link pivots about an axis in this plane. The lower end of the link is twisted at right angles to the rest of the link and is formed with a notch 51 which rides on the end edge of the spring 27 between a pair of ears 52 preventing lateral movement of the link.

The contact-carrying arm 25 and rocker member 26 are normally biassed, by the leaf spring 27, to the full line position shown in FIGURE 3 of the accompanying drawings, and in this position a pair of shoulders 53 on opposite sides of the plunger 47 abut the inside of the casing to limit upward movement of the plunger. When the plunger is depressed, the left-hand ends of the rocker member and spring are pushed downwardly and the line joining the hinge connections of the rocker member with the contact-carrying arm 25 and spring moves over centre with respect to the pivot axis of the arm 25 with the support member 28 whereupon the arm 25 snaps over from its full line to its broken line position shown in FIGURE 1. Release of the plunger allows the contact-carrying arm to snap back to its full line position under the action of the spring 27.

It will be appreciated that each of the switches described above may be modified to take the form of an on-off switch by removing one or other of the terminals 5 or 6 depending on whether the switch is to be biassed for disconnection or connection.

An additional advantage of the embodiment described with references to FIGURES 3 to 7 is that the spring is completely removed from the heated zone set up if an arc is struck on separation of the contacts.

It is to be understood that the embodiments described above are only given by way of example and that modifications can be made thereto without departing from the scope of the invention as defined by the appended claims. For example, the ends of the wire connecting link 18 shown in FIGURES 1 and 2 need not be engaged in locating apertures 19 in the actuating member 14 or the actuating member need not be kinked to provide a pivoting axis for the link. Another way of providing a pivotal connection between the wire link 18 and the actuating member is to locate pivot portions of the link underneath tabs formed up from the actuating member. In a further modification, the connecting link is a plate member having substantially parallel edges at opposite ends thereof for providing the pivots at the plunger and actuating member respectively. This plate member may be formed with one or more tabs for engaging in corresponding apertures in the actuating member.

With the switch construction according to this invention, the connecting link, which is positively located with respect to the actuating member or spring, ensures substantially constant travels, operating and return forces. In conventional switches in which the plunger operates directly on the actuating member the operating point is continuously variable due to the sliding action, and produces wear, which in turn, also varies the travels and operating forces. The switch according to the invention can thus be constructed as having a micrometer movement, which is consistent in each individual switch and between switches of similar type.

I claim:

1. In a snap-action electric switch of the type comprising movable contact means, and an over-centre mechanism connected to move said contact means between two positions on opposite sides of a dead centre position for the mechanism and yieldingly retain said contact means in a selected one of said two positions, said over-centre mechanism comprising a spring member and two arm members, two of said members having ends mounted respectively by first and second hinges on fixed abutment means, said first and second hinges being in spaced relation and said first hinge being located in said dead centre position, the third one of said members interconnecting said two members and having third and fourth hinges connecting opposite ends thereof to said two members respectively, whereby an imaginary line joining the axes of said third and fourth hinges is normally located, under the action of said spring member, on one side of said first hinge, and said contact means being carried by one of said arm members, the improvement which comprises a plunger for actuating said over-centre mechanism, and a link pivotally attached to said plunger and hingedly connected to one of said members of said over-centre mechanism to actuate said mechanism in response to depression of the plunger to cause said imaginary line to move over-centre with respect to said first hinge and said contact carrying arm member to snap-over said contact means from said one position to the other position.

2. A switch as claimed in claim 1, in which said contact carrying arm member is hinged at one end to first fixed abutment means in the form of a support member by said first hinge, the other arm member is hinged to second fixed abutment means by said second hinge, said spring member is a tension spring connected to said contact carrying arm member and said other arm member by said third and fourth hinges, and said link is hingedly connected to said other arm member adjacent the opposite end thereof to said second hinge.

3. A switch as claimed in claim 1, in which said contact carrying arm member is hinged at one end to fixed abutment means in the form of a support member by said first hinge and the other of said arm members, which acts as a rocker member, has opposite ends connected respectively to said contact carrying arm member and said spring member by said third and fourth hinges, said spring member being a compression spring and having its end remote from said rocker member connected to said support member by said second hinge on the opposite side of said support member to said first hinge.

4. A switch as claimed in claim 3, in which said compression spring is a leaf spring and at least said first, third and fourth hinges are formed by knife edges.

5. A switch as claimed in claim 1, in which said link is pivoted to said plunger about an axis lying in a central longitudinal plane of said plunger and spaced from the end of said plunger adjacent the over-centre mechanism.

6. A switch as claimed in claim 5, in which said link is pivoted at one end to said plunger by having an edge thereof seated in the apex of a triangular slot in said plunger.

7. A switch as claimed in claim 4, in which said link is hinged to the end of said leaf spring connected to said rocker member by having an edge, which extends transversely to the adjacent end edge of said spring, riding on said end edge of said spring.

References Cited

UNITED STATES PATENTS

| | | | |
|---|---|---|---|
| 2,547,765 | 4/1951 | Lund | 200—172 |
| 2,810,030 | 10/1957 | Ball | 200—67 |
| 2,821,587 | 1/1958 | Cherry | 200—67 |
| 2,898,428 | 8/1959 | Holden | 200—172 |
| 2,947,831 | 8/1960 | Ridell | 200—67 |
| 3,098,903 | 7/1963 | Anderson | 200—67 |
| 3,248,959 | 5/1966 | Angold | 200—67 |

FOREIGN PATENTS

| | | |
|---|---|---|
| 1,344,484 | 10/1963 | France. |
| 1,118,310 | 11/1961 | Germany. |
| 944,096 | 12/1963 | Great Britain. |
| 765,474 | 1/1957 | Great Britain. |
| 289,512 | 7/1953 | Switzerland. |

ROBERT K. SCHAEFER, *Primary Examiner.*

KATHLEEN CLAFFY, ROBERT S. MACON,
*Examiners.*

D. SMITH, JR., *Assistant Examiner.*